United States Patent
Abbasi et al.

(10) Patent No.: US 11,124,320 B2
(45) Date of Patent: Sep. 21, 2021

(54) SPACECRAFT CONTROL USING RESIDUAL DIPOLE

(71) Applicant: CANADIAN SPACE AGENCY, Saint-Hubert (CA)

(72) Inventors: Viqar Abbasi, Brossard (CA); Michel Doyon, Mont Saint-Hilaire (CA)

(73) Assignee: CANADIAN SPACE AGENCY, Saint-Hubert (CA)

( * ) Notice: Subject to any disclaimer, the term of this patent is extended or adjusted under 35 U.S.C. 154(b) by 279 days.

(21) Appl. No.: 16/273,837

(22) Filed: Feb. 12, 2019

(65) Prior Publication Data
US 2020/0255165 A1 Aug. 13, 2020

(51) Int. Cl.
- *B64G 1/28* (2006.01)
- *B64G 1/24* (2006.01)
- *B64G 1/32* (2006.01)

(52) U.S. Cl.
CPC ............ *B64G 1/283* (2013.01); *B64G 1/242* (2013.01); *B64G 1/244* (2019.05); *B64G 1/32* (2013.01)

(58) Field of Classification Search
CPC ........ B64G 1/283; B64G 1/244; B64G 1/242; B64G 1/32; B64G 1/285
See application file for complete search history.

(56) References Cited

U.S. PATENT DOCUMENTS

| | | | |
|---|---|---|---|
| 3,189,298 A * | 6/1965 | Buckingham | B64G 1/32 244/166 |
| 4,010,921 A * | 3/1977 | Pistiner | B64G 1/283 244/166 |
| 4,062,509 A | 12/1977 | Muhlfelder et al. | |
| 4,071,211 A | 1/1978 | Muhlfelder et al. | |
| 4,883,244 A * | 11/1989 | Challoner | B64G 1/28 244/171 |
| 5,047,945 A * | 9/1991 | Paluszek | B64G 1/32 701/13 |
| 5,123,617 A * | 6/1992 | Linder | B64G 1/283 244/166 |
| 5,305,971 A | 4/1994 | Decanini | |

(Continued)

FOREIGN PATENT DOCUMENTS

| | | | |
|---|---|---|---|
| CN | 104828261 A | 8/2015 | |
| DE | 4007497 A1 * | 9/1991 | ............ B64G 1/32 |
| DE | 4007497 A1 | 9/1991 | |

OTHER PUBLICATIONS

R. E. Goetz, The Use of Magnetic Torquing for Control Moment Gyro Desaturation, Dec. 5, 1969, NASA, NAS 9-8166 (Year: 1969).*

(Continued)

*Primary Examiner* — Joshua J Michener
*Assistant Examiner* — Colin Zohoori
(74) *Attorney, Agent, or Firm* — Thomas | Horstemeyer, LLP

(57) ABSTRACT

A method for desaturating reaction wheels of a spacecraft having a magnetic dipole is provided. The method includes orienting the spacecraft relative to an external magnetic field to apply a torque to the spacecraft via the magnetic dipole in a direction opposing momentum stored in the reaction wheels; and using the applied torque to unload at least some of the momentum stored in the reaction wheels. A corresponding spacecraft and non-transitory computer-readable medium are also provided.

18 Claims, 10 Drawing Sheets

(56) References Cited

U.S. PATENT DOCUMENTS

| | | | |
|---|---|---|---|
| 5,788,189 A * | 8/1998 | Iida | B64G 1/32 244/166 |
| 5,996,941 A * | 12/1999 | Surauer | B64G 1/365 244/165 |
| 6,254,036 B1 * | 7/2001 | Sevaston | B64G 1/283 244/164 |
| 6,523,785 B1 | 2/2003 | Hennigan | |
| 8,798,816 B1 * | 8/2014 | Guyot | B64G 1/28 701/13 |
| 2002/0125374 A1 | 9/2002 | Anzel | |
| 2004/0010355 A1 | 1/2004 | Meffe et al. | |
| 2009/0020650 A1 | 1/2009 | Ho | |
| 2011/0153123 A1 | 6/2011 | Thomas et al. | |
| 2014/0138491 A1 | 5/2014 | Woo et al. | |
| 2015/0225092 A1 | 8/2015 | Moro | |

OTHER PUBLICATIONS

Patrick H. Stakem, Passive Magnetic Momentum Wheel Unloading, Jun. 1977, OAO Corporation, vol. 14, No. 6 (Year: 1977).*

Matthew Herzl, CUSRS 10_13, "Estimation of Magnetic Torquing and Momentum Storage Requirements for a Small Satellite", Mar. 29, 2010, 11 pages.

Erik A. Hogan et al., "Three-Axis Attitude Control Using Redundant Reaction Wheels With Continuous Momentum Dumping", American Astronautical Society, Feb. 10-14, 2013, 14 pages.

* cited by examiner

SPACECRAFT CONTROL USING RESIDUAL DIPOLE

FIELD

The field generally relates to spacecraft attitude control, and more particularly to a method and apparatus for unloading reaction wheel momentum using a magnetic dipole of a spacecraft.

BACKGROUND

Spacecraft are often provided with reaction wheels which allow for momentum to be transferred between the wheels and the spacecraft body. Transferring momentum in this fashion can allow for precise control of the spacecraft's attitude. However, excess momentum can build up in the reaction wheels over time as they counter disturbance torques to maintain pointing at a particular attitude. It is therefore necessary to regularly unload excess momentum building up in the reaction wheels to avoid saturation and maintain attitude control.

There are different existing methods for unloading momentum of a spacecraft. Such methods involve using some form of actuator to generate a torque which can be used to counter the excess momentum. For spacecraft in proximity to an ambient magnetic field (for example in Low Earth Orbit), a common method for unloading momentum involves the use of magnetorquers (also known as magnetic torquers or torque rods) to interact with the ambient magnetic field to generate a desired torque. Unfortunately, complete or partial failure of the magnetorquer subsystem can be a mission-killer, as absent a redundant actuator, it would no longer be possible to unload momentum, resulting in the eventual saturation of the reaction wheels and loss of attitude control.

SUMMARY

According to an aspect, a method for desaturating reaction wheels of a spacecraft having a magnetic dipole is provided. The method includes the processes of: a) orienting the spacecraft relative to an external magnetic field to apply a torque to the spacecraft via the magnetic dipole in a direction opposing momentum stored in the reaction wheels; and b) using the applied torque to unload at least some of the momentum stored in the reaction wheels.

In an embodiment, the method includes a preliminary process of determining a magnetic dipole vector corresponding to a magnitude and direction of the magnetic dipole of the spacecraft; and process b) includes orienting the spacecraft to align the magnetic dipole vector relative to the external magnetic field to apply the torque in the direction opposing the momentum.

In an embodiment, determining the magnetic dipole includes: monitoring a change in momentum of the spacecraft over a trajectory of the spacecraft relative to a known or measurable external magnetic field, said change in momentum being caused by a torque applied to the spacecraft by the external magnetic field via the spacecraft's magnetic dipole; and using the monitored change in momentum and known or measurable external magnetic field to solve for the magnetic dipole vector.

In an embodiment, desaturating the reaction wheels using the applied torque includes slowing down the reaction wheels to unload momentum in a direction which opposes the applied torque.

In an embodiment, the method includes: determining a magnetic field vector corresponding to a direction and magnitude of the external magnetic field relative to the spacecraft; determining a momentum vector corresponding to a magnitude and direction of a total momentum of the spacecraft; determining a target torque vector corresponding to a torque which opposes the momentum vector; and orienting the spacecraft to align the magnetic dipole of the spacecraft relative to the magnetic field vector to produce the torque in the direction of the target torque vector.

In an embodiment, the method further includes determining a target dipole vector corresponding to a cross product between the magnetic field vector and the momentum vector, and wherein orienting the spacecraft comprises adjusting an attitude of the spacecraft to orient the magnetic dipole of the spacecraft in alignment with the target dipole vector.

In an embodiment, the method further includes applying an additional constraint to resolve a degree of freedom of the orientation of the spacecraft while the produced torque is in the direction of the target torque vector.

In an embodiment, the target torque vector is calculated continuously throughout a trajectory of the spacecraft; and the spacecraft is continuously reoriented to maintain the alignment of the magnetic dipole relative to the external magnetic field to produce the torque in the direction of the target torque vector as the magnetic field vector and momentum vector change throughout the spacecraft's trajectory, thereby unloading momentum from the spacecraft.

In an embodiment, the method further includes, when the magnitude of the momentum vector is below a predetermined threshold, orienting the spacecraft to substantially align the magnetic dipole with the magnetic field vector to attenuate changes in the spacecraft's momentum.

In an embodiment, the spacecraft is orbiting the Earth and the external magnetic field corresponds to Earth's magnetic field, and the magnetic field vector is determined by determining a current position and orientation of the spacecraft relative to the Earth, and using a stored model of Earth's magnetic field to estimate the magnitude and direction of Earth's magnetic field at the determined current position and orientation.

In an embodiment, the method includes continuously determining an instantaneous orientation of the spacecraft; and continuously adjusting the orientation of the spacecraft to maintain an alignment of the magnetic dipole relative to the external magnetic field to either produce a torque in the direction opposing the spacecraft momentum, or minimize torques and changes to the spacecraft momentum.

In an embodiment, at least one of the reaction wheels is oversaturated and the spacecraft is in a tumbling state due to a lack of control authority, and the method includes: determining a desired orientation of the spacecraft relative to the external magnetic field which applies, via the magnetic dipole, the torque in the direction which opposes the excess momentum; during a period of the tumbling in which the spacecraft is rotating towards the desired orientation, operating the reaction wheels to decelerate the tumbling of the spacecraft; and during a period of the tumbling in which the spacecraft is rotating away from the desired orientation, operating the reaction wheels to accelerate the tumbling of the spacecraft.

In an embodiment, the method includes restoring attitude control by desaturating the reaction wheels while the spacecraft is rotating towards the desired orientation, continuously until the reaction wheels are no longer oversaturated, and once attitude control is restored, performing steps a) and b) to unload remaining excess momentum.

In an embodiment, the reaction wheels are desaturated without the use of torque rods.

In an embodiment, orienting the spacecraft includes operating the reaction wheels to adjust an attitude of the spacecraft.

In an embodiment, the magnetic dipole is a permanent residual dipole of the spacecraft.

In an embodiment, the external magnetic field is produced by a celestial body.

According to an aspect, a method for operating a spacecraft is provided. The method includes transmitting instructions to a spacecraft, said instructions causing the spacecraft to desaturate its reactions wheels according to the method as described above.

According to an aspect, a spacecraft is provided. The spacecraft includes: a body; at least three reaction wheels supported by the body; electronic components supported by the body and producing a magnetic dipole; an actuator for adjusting an attitude of the spacecraft; and a controller in operative communication with the reaction wheels and the actuator, said controller being programmed with instructions to: adjust the attitude of the spacecraft relative to an external magnetic field to apply a torque to the spacecraft body via the magnetic dipole in a direction opposing momentum stored in the reaction wheels; and operate the reaction wheels to unload at least some of the momentum stored in the reaction wheels using the applied torque.

According to an aspect, a non-transitory computer-readable medium is provided. The non-transitory computer-readable medium has instructions stored thereon which, when executed by a processor of a control system onboard a spacecraft having a magnetic dipole, cause the processor to carry out the processes of: a) orienting the spacecraft relative to an external magnetic field to apply a torque to the spacecraft via the magnetic dipole in a direction opposing momentum stored in the reaction wheels; and b) using the applied torque to unload at least some of the momentum stored in the reaction wheels.

DETAILED DESCRIPTION

Figure 1:
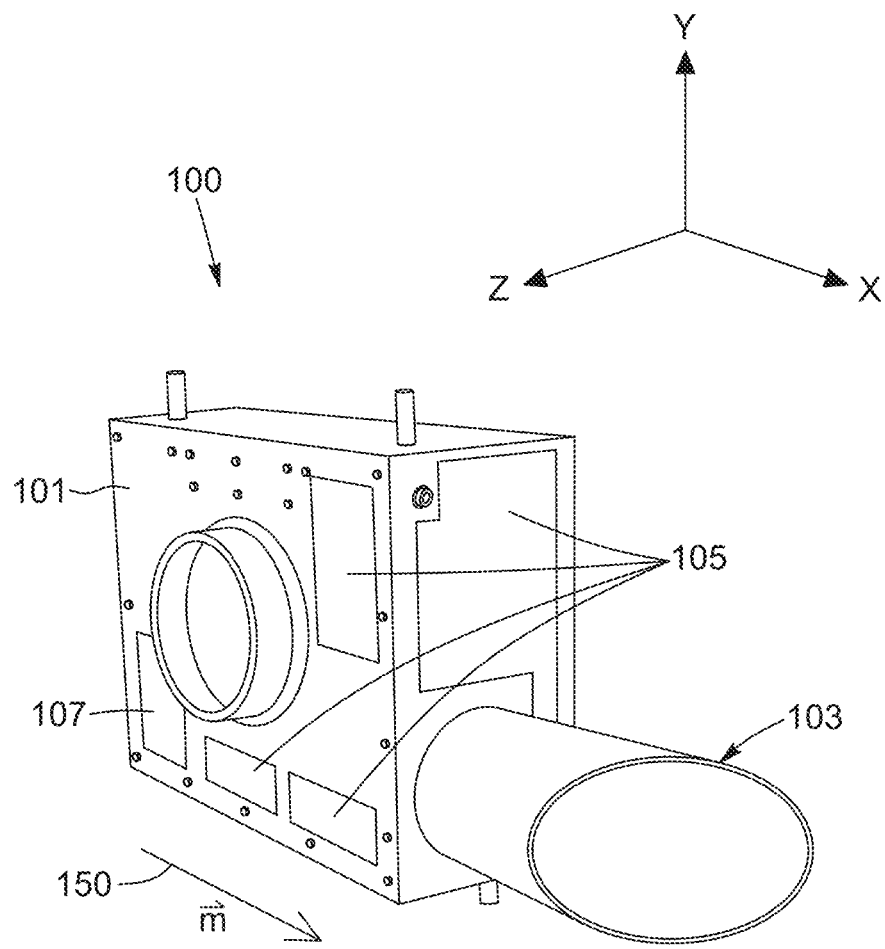
FIG. 1 is a perspective view of a spacecraft, according to an embodiment.

Various embodiments are described hereinafter with reference to the figures. It should be noted that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, the description and figures are not to be considered as limiting the scope of the invention in any way, but rather as merely describing the implementation of the various exemplary embodiments.

Figure 2:
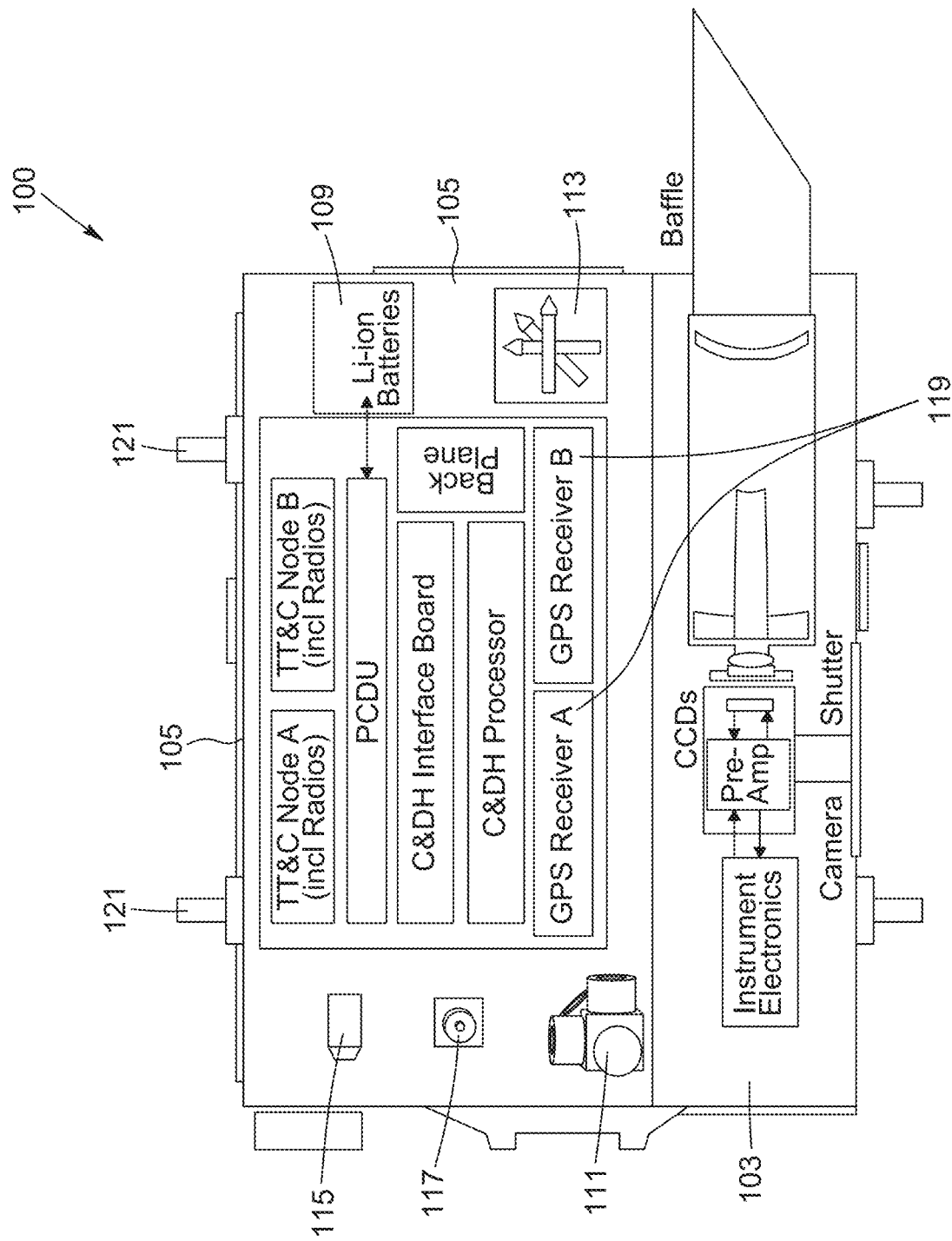
FIG. 2 is a schematic showing components of the spacecraft of FIG. 1.

With reference to FIGS. 1 and 2, a spacecraft 100 is shown according to an embodiment. In the present embodiment, spacecraft 100 is an artificial satellite designed to operate in low Earth orbit, but it is appreciated that other types of spacecraft are also possible. For example, spacecraft can be a different type of artificial satellite and/or can be a different type of man-made device designed to operate in space.

The illustrated spacecraft 100 comprises a body 101 having a substantially cuboid shape. More specifically, body 101 comprises a housing having six faces respectively facing in the +x, −x, +y, −y, +z and −z directions in a body frame of reference. It is appreciated, however, that different configurations and shapes of body 101 are also possible. Moreover, in the present embodiment, body 101 is configured such that spacecraft 100 corresponds to a microsatellite (ex: between approx. 10 and 100 kg), but it is appreciated that other sizes are also possible.

The spacecraft 100 can include a number of modules, allowing for spacecraft 100 to be operated and/or controlled. For example, in the present embodiment, the spacecraft 100 comprises a payload module 103, solar panel module 105, a thermal control 107, battery module 109, reaction wheel module 111, magnetorquer module 113, magnetometer module 115, sun sensor module 117, and a GPS module 119 among others. As can be appreciated, each module can comprise a number of components secured relative to and/or forming part of body 101, and each can be operated to perform a number of different functions and/or form part of one or more subsystems relating to spacecraft 100 operation and control. Although the modules are shown as distinct elements, it is appreciated that this is for illustrative purposes only, and that different modules can share components and/or that components of a given module can perform multiple functions, including those of one or more other modules.

In more detail now, payload 103 can be secured relative to body 101 for carrying out operations in space. In the present embodiment, payload 103 is a scientific payload, and includes a telescope which can be used to detect celestial objects. It is appreciated that telescope can also function as a star tracker and can, for example, form part of a navigational or guidance subsystem, acting as an attitude sensor to determine the spacecraft's orientation. Although in the present embodiment payload 103 comprises a telescope, it is appreciated that different payloads are possible depending on the mission.

Solar panel module 105 can comprise one or more solar panels exposed on an exterior of the spacecraft body 101. In the present embodiment, solar panels are mounted on each of the faces of body 101, but it is appreciated that in other embodiments, solar panels can be provided on only some faces and/or can be spaced apart from the spacecraft body 101 for example via a support. As can be appreciated, solar panel module 105 can serve to generate electricity to power electrical components/modules of spacecraft 100. Solar panel module 105 can also form part of the navigational or guidance subsystem, for example acting as a coarse sun sensor to estimate the attitude of spacecraft by measuring sun exposure of the different faces of the spacecraft body 101.

Thermal control module 107 can be provided to maintain the components/modules of the spacecraft 100 at acceptable temperatures during operation. In the present embodiment, thermal control module 107 comprises one or more radiators for dissipating excess heat from spacecraft body 101. It is appreciated that in other embodiments, other types of active and/or passive thermal control elements can be provided, such as heaters, louvers, among others.

Battery module 109 can comprise one or more batteries operatively connected to solar panel module 105. As can be appreciated, battery module 109 can store energy which can be used to power the various components/modules of the spacecraft 100. Battery module 109 can be charged by solar panels and/or by other energy generating means, and can be configured to supply energy as needed, for example during periods when the energy generating means are not supplying sufficient electricity to operate the spacecraft 100. In the present embodiment, the battery module 109 comprises Li-ion batteries, but it is appreciated that in other embodiments, other types of batteries are possible.

Reaction wheels module 111 can form part of the spacecraft's attitude control subsystem and can comprise a plurality of reaction wheels (also referred to as momentum wheels) for storing/transferring momentum to control angular movement of the spacecraft body 101. In the present embodiment, at least three reaction wheels are secured relative to the spacecraft body 101 to allow for three-axis attitude control thereof. More specifically, each reaction wheel is configured to spin about one of three perpendicular axes, in the present embodiment corresponding the x, y, and z axes of spacecraft body 101. It is appreciated, however, that in other embodiments, more reaction wheels can be provided, for example to provide redundancy in case of failure of one or more of the reaction wheels, and/or to increase capacity for momentum storage in one or more axes. It is also appreciated that the position and/or orientation of the reaction wheels can differ, so long as they allow for three-axis attitude control.

As is known to persons of skill in the art, reaction wheels can be used to control attitude of a spacecraft 100 by transferring angular momentum between the spacecraft's body 101 and the reaction wheels. More specifically, each reaction wheel can be secured relative to the spacecraft body 101 and can comprise a flywheel for storing rotational energy, and a motor or other actuator which can be operated to speed up or slow down the flywheel. Angular momentum can be transferred from the spacecraft's body 101 and stored in the reaction wheels by speeding up the flywheel. Similarly, angular momentum stored in the reaction wheels can be transferred to the spacecraft's body 101 by slowing down the flywheel. Transferring angular momentum to and from the spacecraft's body 101 in this fashion can allow for the angular movement of the spacecraft 100 to be precisely controlled. Similarly, unwanted angular momentum building up in the spacecraft's body 101, for example due to external forces or disturbance torques, can be absorbed by (i.e. transferred to) the reaction wheels, for example to maintain the spacecraft in a desired pointing direction. The momentum stored in wheels can be measured, for example, using rate sensors to determine the speed of the wheels.

As can be appreciated, in order to maintain attitude control of the spacecraft 100, the reaction wheels must be capable of fully absorbing the angular momentum of the spacecraft's body 101 at any given moment. Over time, as the reaction wheels absorb unwanted momentum building up in the spacecraft body 101, the reaction wheels may reach a state of "oversaturation" or "hyper saturation" in which they cannot absorb any more momentum (for example, due to the flywheels spinning at a maximum speed). In such a state, the spacecraft can be said to lose control authority, as the reaction wheels can no longer continue to absorb momentum required from the spacecraft body to maintain required stable pointing. Consequently, the spacecraft 100 will start to tumble and become uncontrollable. It is therefore necessary to be able to desaturate the reaction wheels (i.e. unload momentum from the spacecraft) to maintain attitude control.

In some embodiments, spacecraft can be provided with a mechanism to actively unload momentum. In the present embodiment, and by way of example, magnetorquer module 113 is provided as part of the spacecraft's attitude control subsystem to unload (or "dump") momentum to an external body. Magnetorquer module 113 comprises one or more magnetorquers or torque rods operable to generate a magnetic dipole. The generated dipole can interact with an ambient or external magnetic field to generate a torque which can then be used reduce the spacecraft's momentum. In this fashion, the magnetorquers effectively allow for the spacecrafts momentum to be transferred or unloaded to the external body generating the external or ambient magnetic field. Although magnetorquers are described in the present embodiment, it is appreciated that other mechanisms can be provided to unload momentum, including other actuators, such as thrusters.

As can be appreciated, traditional methods for using a magnetorquer module 113 to desaturate reaction wheels would require magnetorquer module 113 to be capable of generating torque along each of the three perpendicular axes about which the reaction wheels spin, in the present embodiment corresponding the x, y, and z axes of spacecraft body 101. In other words, traditional desaturation techniques would require at least three torque rods (i.e. one torque rod per reaction wheel). It is appreciated, that in some embodiments, more torque rods can be provided, for example for redundancy in case of failure. Although existing techniques require at least three torque rods, it will be appreciated that following the novel methods described hereinbelow, it is possible to desaturate reaction wheels using two or fewer torque rods, for example due to partial or total failure of magnetorquer module 113, in situations where it would not be desirable to operate magnetorquer modules 113 (for example to conserve energy), or in embodiments where spacecraft 100 is not provided with a magnetorquer module 113 at all.

In order to interact with an ambient or external magnetic field to produce a desired torque, the characteristics of the external magnetic field should be known (such as the magnitude and direction of the magnetic field at the spacecraft's current position at any given time). In the present embodiment, magnetometer 115 is provided to measure the magnetic field in the x, y, and z directions. Although in the present embodiment a magnetometer 115 is described, it is appreciated that in other embodiments, different sensors can be provided for the purposes of measuring and/or estimating an external magnetic field, for example in the event that magnetometer 115 fails or if spacecraft 100 is not provided with magnetometer 115. For example, in some embodiments, the orientation and position of spacecraft 100 relative to a celestial body can be used to estimate the magnitude and direction of the external magnetic field, using an existing model of the external magnetic field. It is further appreciated that magnetometer 115 can be used as part of the spacecraft's navigational or guidance subsystem, for example to determine the spacecraft's attitude by correlating the measured magnetic field with an existing model of the external magnetic field.

In the illustrated embodiment, sun sensor module 117 and GPS module 119 are also provided as part of the spacecraft's navigational or guidance subsystem. Sun sensor module 117 comprises one or more sensors configured to detect the position of the sun relative to the spacecraft 100. As can be appreciated, the sun sensor module 117 can comprise one or more dedicated photosensors, although it is appreciated that other types of sensors are also possible. Moreover, as explained above, although sun sensor module 117 is illustrated separately from solar panel module 105, it is appreciated that the solar panels can be configured to act as a sun sensor module 117.

GPS module 119 can comprise one or more receivers configured to receive and process GPS signals from nearby GPS satellites via one or more antennae 121 positioned on different sides of the spacecraft body 101. As can be appreciated, measuring the GPS signals can allow for determining distances between the spacecraft 100 and GPS satellites. Thus, processing the GPS signals can allow for determining a current position of the satellite relative to the GPS satellites. Moreover, given the known position of the GPS satellites, processing the GPS signals in this fashion can allow for determining the spacecraft's position relative to the Earth in addition to the spacecraft's attitude. Accordingly, the GPS module 119 can, in some embodiments, act as an attitude sensor. It can further act in place of magnetometer module 115, for example by using a model of the Earth's magnetic field to estimate the strength of the magnetic field at the measured position and orientation of the spacecraft. Although a GPS module 119 is described, it is appreciated that attitude and/or position can be determined using other satellite-based navigation systems.

Although in the present embodiment a sun sensor module 117 and GPS module 119 are described, it is appreciated that in other embodiments, other elements can form part of the spacecraft's navigational subsystem, including a different types of attitude sensors such as a horizon sensor, an orbital gyrocompass, an earth sensor, a star tracker, and a magnetometer, among others.

The various modules described above, in addition to other modules operating in the spacecraft 100, include materials and electrical components which are each susceptible to creating a magnetic field. The combined effect of these magnetic fields results in the spacecraft 100 having a net magnetic dipole 150 which can be characterized as a vector $\vec{m}$ having a given magnitude and direction relative to the spacecraft body 101. The magnetic dipole 150 can be referred to as a residual dipole in that it is a side effect of any current-carrying devices in the spacecraft 100 and/or its payload 103, and/or any materials provided in the spacecraft 100 and/or its payload 103, including any magnetic materials or metallic structures (such as metallic frame of spacecraft body 101) having eddy currents produced therein. In some embodiments, the magnetic dipole 150 can be substantially static, in that it will change very little (ex: <10%) or not at all over the course of a mission. In other embodiments, the magnetic dipole 150 can be variable, in that it can change over the course of a mission, for example when some electrical components are operated or powered on and/or when some components are powered down. In some embodiments, the dipole 150 can be manipulated purposely, for example by using specialized components such as a magnetorquer module 113, if available.

As can be appreciated, the magnetic dipole 150 of the spacecraft 100 can interact with an ambient or an external magnetic field in order to produce a torque on the spacecraft 100. For example, with reference to FIG. 3, an exemplary spacecraft 100 is shown in orbit around a celestial body 350 (in this case the Earth) producing an ambient magnetic field B. As shown in exemplary orbital position 300, the torque $\vec{g_m}$ associated with the spacecraft's dipole $\vec{m}$ against the magnetic field B is given by the cross product $\vec{g_m} = \vec{m} \times \vec{B}$. Following existing methods for spacecraft control, torque $\vec{g_m}$ can be considered as a disturbance torque producing excess momentum which would need to be absorbed by the reaction wheels. However, it will be appreciated that in some control methods, this torque can be used in order to reduce momentum of the spacecraft 100. As can be appreciated, this can be useful when traditional desaturating methods have failed or are not available, for example in the event of partial or total torque rod failure, or if spacecraft is not provided with torque rods.

Broadly described, a method for reducing momentum of a spacecraft 100 can comprise orienting the spacecraft 100 relative to an external or ambient magnetic field to apply a torque to the spacecraft via the magnetic dipole 150 in a direction opposing the momentum. The applied torque can subsequently be used to reduce, discharge, or dump the momentum. As can be appreciated, the momentum to be reduced can be defined as a vector $\vec{H}$. In order to reduce the momentum, the generated torque $\vec{g_m}$ should be in a direction which opposes momentum vector $\vec{H}$. It should be appreciated that the momentum vector $\vec{H}$ can correspond to any momentum which is desired to be discharged. For example, the vector $\vec{H}$ can correspond to the momentum stored in the spacecraft's reaction wheels 117, the momentum of the spacecraft's body 101, and/or a combination of both. As can be appreciated, it is often required to reduce momentum to maintain attitude control of the spacecraft 100. Accordingly, momentum can be referred to as "excess" momentum, which can correspond to the total momentum of the spacecraft 100 and/or a portion thereof.

Given a spacecraft momentum vector $\vec{H}$, an ambient magnetic field vector $\vec{B}$, and a spacecraft dipole vector $\vec{m}$, a target orientation or attitude of the spacecraft 100 can be determined in order to produce a torque $\vec{g_m}$ which opposes momentum vector $\vec{H}$. In the present embodiment, and as illustrated in exemplary orbital position 301 of FIG. 3, a target inertial dipole vector $\vec{M_t}$ can be calculated by taking the cross product of the magnetic field vector and the momentum vector $\vec{M_t} = \vec{B} \times \vec{H}$. As shown in FIG. 4, when the attitude of the spacecraft 100 is adjusted to bring the spacecraft dipole vector $\vec{m}$ in alignment with the target dipole vector $\vec{M_t}$ the resulting torque $\vec{g_{M_t}}$ will be in a direction opposing momentum vector $\vec{H}$ effectively allowing the momentum of the spacecraft to be reduced. Although in the present embodiment a target dipole vector $\vec{M_t}$ is used to determine a desired orientation of spacecraft 100, it is appreciated that other targets vectors can be used, and/or that other orientation algorithms can be applied, so long as the torque $\vec{g_m}$ produced via dipole opposes the spacecraft momentum. For example, in some embodiments, a target torque vector can be determined, and a desired orientation of the spacecraft can be determined in order to produce a torque $\vec{g_m}$ aligned with the target torque vector.

Figure 5:
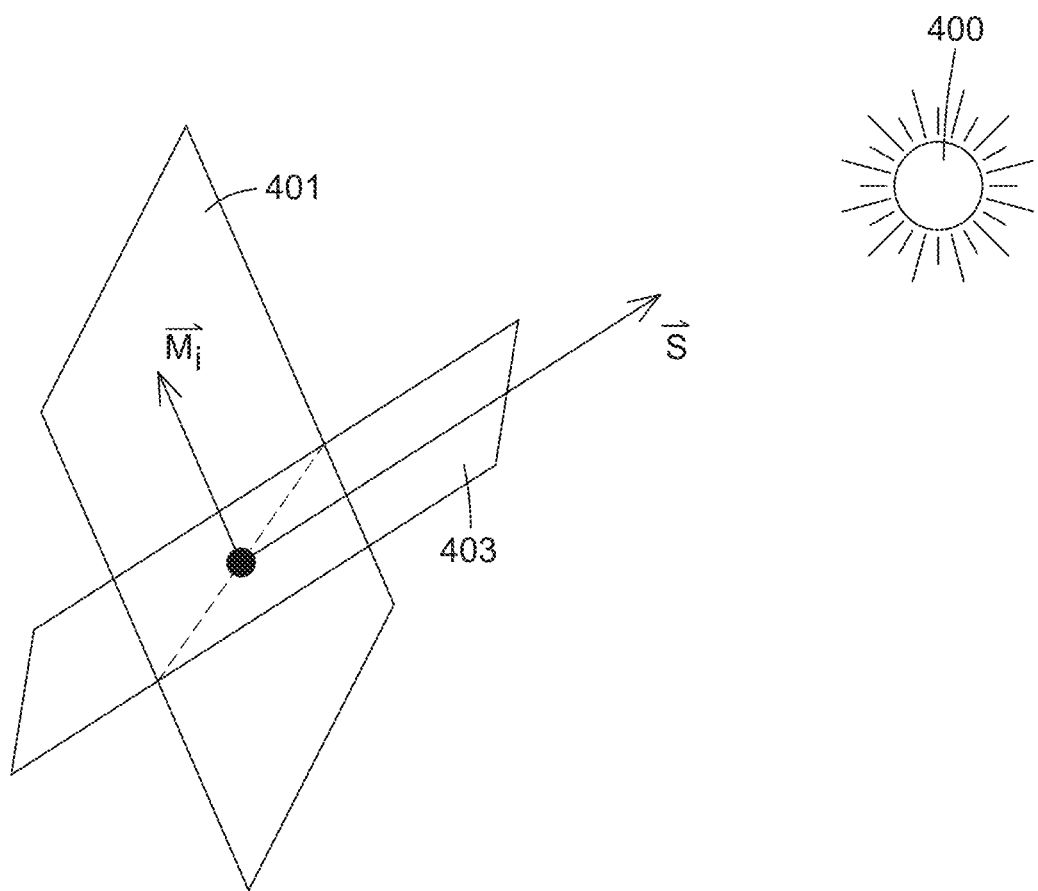
FIG. 5 is a schematic illustrating the use of two vectors to provide a triad solution for a desired orientation of the spacecraft.

As can be appreciated, in calculating a target inertial dipole vector $\vec{M_t}$ as described above, a degree of freedom will remain, as the spacecraft 100 will be free to rotate about the $\vec{M_t}$ vector while satisfying the condition that $\vec{m}$ and $\vec{M_t}$ remain in alignment. Accordingly, in some embodiments, calculating a target orientation can comprise a process of applying an additional constraint to resolve the remaining degree of freedom, and provide a unique solution for a desired orientation of the spacecraft. For example, as illustrated in FIG. 5, a Sun vector $\vec{S}$ can be applied as an additional constraint to resolve the degree of freedom. In the illustrated embodiment, the Sun vector $\vec{S}$ corresponds to an orientation of the spacecraft 100 (defined as a vector) which defines an optimal power and thermal body-frame direction, for example maximizing exposure of solar panels 105 to the Sun 500, while minimizing exposure of radiator 107 and/or batteries 109. It is appreciated that this vector can vary according to the design of the spacecraft 100 and/or mission-specific requirements. It is also appreciated that other vectors or constraints can be applied instead of Sun vector $\vec{S}$ such as an optimal antenna pointing direction, or an optimal payload pointing direction, among others.

As shown in FIG. 5, without applying an additional constraint, $\vec{M_t}$ provides a single body-frame-to-inertial-frame target which effectively allows the spacecraft 100 to orient itself in a plane 403 perpendicular to target dipole vector $\vec{M_t}$. The Sun vector $\vec{S}$ provides a second body-frame-to-inertial-frame target which allows the spacecraft to orient itself in a plane 401 perpendicular to the Sun vector $\vec{S}$. Applying both the dipole vector $\vec{M_t}$ and Sun vector $\vec{S}$ body-frame-to-inertial-frame targets provides a triad solution which can give a single solution for a desired desaturation pointing attitude for the spacecraft. As illustrated in FIG. 5, this essentially corresponds to the intersection between planes 401 and 403. As can be appreciated, depending on the relative orientations of both body-frame-to-inertial-frame targets, it may not be possible to fully respect both constraints. Therefore, in some embodiments, determining the desired desaturation pointing attitude can comprise determining an orientation which corresponds to an exact match to the body-to-inertial-frame spacecraft dipole vector $\vec{M_t}$, and a best-fit solution to the body-to-inertial-frame Sun vector $\vec{S}$.

Figure 9:
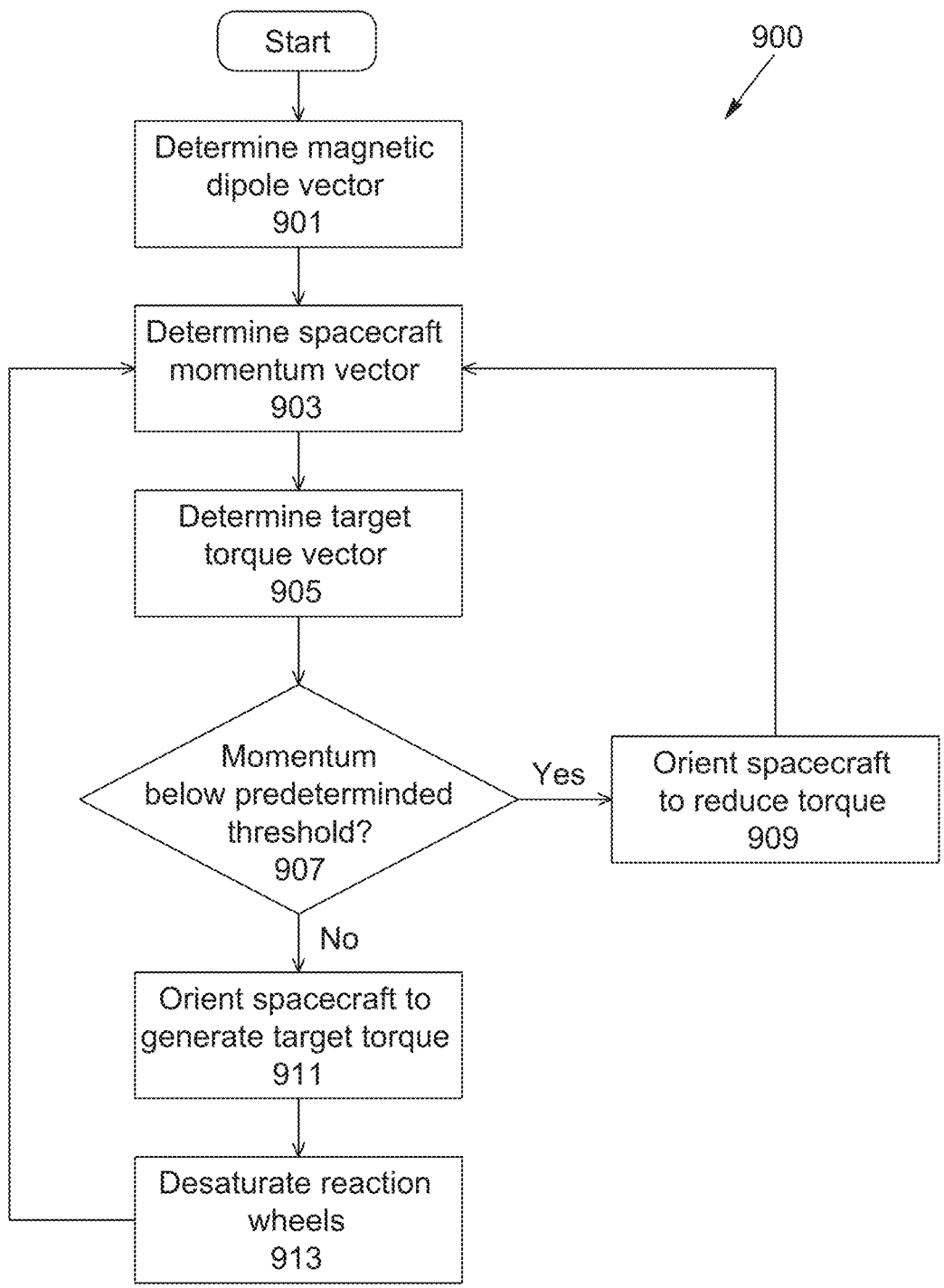
FIG. 9 is a flowchart illustrating a method for desaturating a spacecraft using available control authority to orient the spacecraft, according to an embodiment.

With reference now to FIG. 9, a method 900 for reducing momentum of a spacecraft is shown according to an embodiment. As will be appreciated, the method 900 includes a number of processes which can be carried out by a processor in a control system onboard the spacecraft. In some embodiments, the method can be carried out autonomously by the processor, whereas in other embodiments, the process can be commanded from the ground, for example through the transmission of control signals to the satellite from a ground control station. In some embodiments, the control system can be programmed with instructions to carry out the method 900 prior to launch, whereas in other embodiments the spacecraft can be programmed with such instructions while in space. Finally, it should be appreciated that although processes of method 900 are described in a particular order, this is for exemplary purposes only, and some processes can be carried out in a different order in other embodiments.

A first process 901 can comprise determining a magnetic dipole vector $\vec{m}$ describing a magnitude and direction of the magnetic dipole of the spacecraft. In some embodiments, the dipole of the spacecraft can be determined by measuring the net dipole directly, for example on the ground prior to launch and/or using a duplicate model of the spacecraft, if available. In some embodiments, the dipole can be determined while the spacecraft is in space and/or in orbit about a celestial body. As described above, as the spacecraft travels relative to an external or ambient magnetic field, the external or ambient magnetic field will interact with the spacecraft's dipole to generate torque and impart momentum to the spacecraft. Therefore, changes in the spacecraft's momentum can be monitored over a trajectory, and these changes can be used to mathematically solve for the spacecraft's momentum, provided the external or ambient magnetic field is known or measurable (ex: using a magnetometer, or a model of the magnetic field). It is appreciated, however, that other techniques for determining the spacecraft's dipole are also possible.

A second process 903 can comprise determining a momentum vector $\vec{H}$ describing the magnitude and direction of momentum stored in the spacecraft. As can be appreciated, the momentum can be measured using sensors onboard the spacecraft, for example by measuring an angular rotation speed of each of the reaction wheels, and by measuring an angular rotation speed of the spacecraft's body. In the present embodiment, the momentum vector $\vec{H}$ is calculated as the total momentum stored in the spacecraft, and therefore corresponds to the total momentum stored in both the reaction wheels and the spacecraft body. It is appreciated that in other embodiments, the momentum vector $\vec{H}$ can be calculated differently.

A third process 905 can comprise determining a target pointing vector, describing an orientation of the spacecraft to produce a torque which opposes $\vec{H}$. As can be appreciated, the target pointing vector of the spacecraft is based on a desired interaction of dipole vector $\vec{m}$ with an ambient or external magnetic field. Accordingly, process 905 can comprise determining magnetic field vector $\vec{B}$ describing the magnitude and direction of the ambient or external magnetic field relative to the spacecraft. The magnetic field vector $\vec{B}$ can be measured using a magnetic field sensor onboard the spacecraft as described above, such as a magnetometer and/or can be estimated using a position/orientation sensor in combination with a known model of the ambient or external magnetic field. As can be appreciated, the target pointing vector can be any vector which aligns the spacecraft so as to produce the desired torque. In the present embodiment, the target pointing vector corresponds to a target dipole vector $\vec{M_t}$ defining a desired alignment of the spacecraft's dipole vector $\vec{m}$ when the spacecraft is correctly oriented. As described above, this can be calculated by taking a cross product between the magnetic field vector $\vec{B}$ and the momentum vector $\vec{H}$, and resolving a degree a freedom by applying a Sun vector $\vec{S}$. It is appreciated that further parameters can be taken into account when calculating the target orientation. For example, the target orientation can be limited to a predetermined amount relative to the spacecraft's current orientation. This can be useful, for example, to avoid changing the orientation of the spacecraft too rapidly and exceeding maximum desired body rotation rates of the spacecraft. Accordingly, in this fashion, the target pointing direction can be said to be limited by a defined maximum body rotation rate of the spacecraft.

A fourth process 907 can comprise determining whether the spacecraft's momentum is below a predetermined threshold. As can be appreciated, as the spacecraft momentum is reduced to small levels, small perturbations in the determined momentum vector $\vec{H}$ caused by estimation error can have a significant impact on calculations to determine a target pointing vector of the spacecraft. Accordingly, corrective measures can be taken to avoid instabilities when the spacecraft momentum is small. The threshold used for this purpose can vary in different implementations and/or can be based on different parameters or metrics relating directly or indirectly to the momentum vector $\vec{H}$. For example, in the present embodiment, determining whether the momentum vector $\vec{H}$ is below a predetermined threshold comprises calculating a metric $M_{factor}$ corresponding to the ratio $\|\vec{M_t}\|/\|\vec{B}\|$. If $M_{factor}$ is not below a predetermined threshold, the method can continue normally. If $M_{factor}$ is below the predetermined threshold, the control objective can be no longer to dump momentum, but rather to avoid momentum buildup. For this objective, a new target orientation can be used, aligning the spacecraft dipole with the magnetic field to minimize the production of torque and maintain a low amplitude for the onboard momentum. As can be appreciated, $M_{factor}$ will also be small when $\vec{B}$ and $\vec{H}$ are aligned, defining another scenario where the control objective can be to minimize momentum buildup to avoid instabilities. Accordingly, the fourth process 907 can, in some embodiments, comprise determining whether the magnetic field vector $\vec{B}$ and the momentum vector $\vec{H}$ are substantially aligned.

Figure 7:
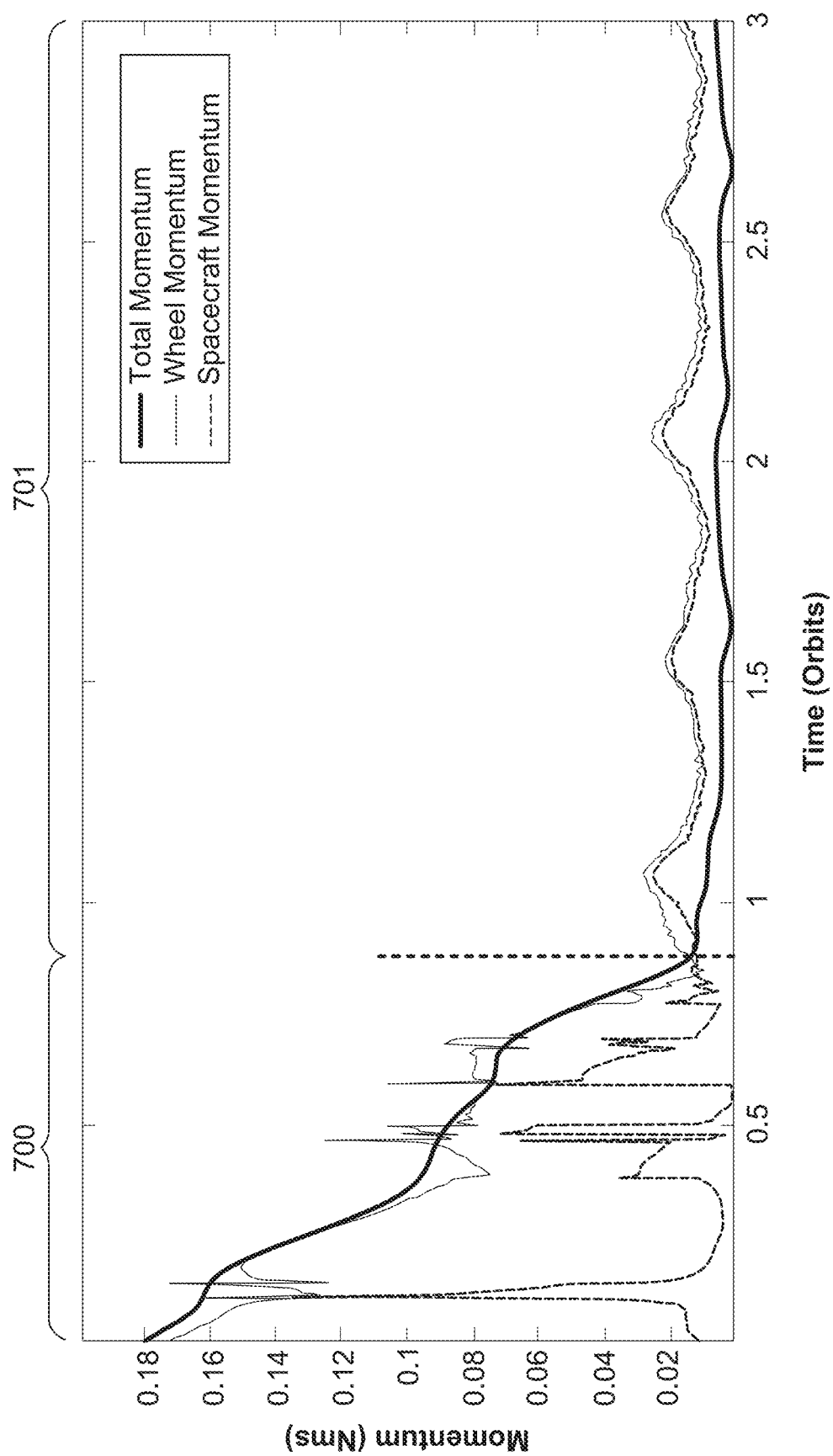
FIG. 7 is a simulation graph illustrating total spacecraft momentum during desaturation and while parked.

By way of example, in the present embodiment, the control state of avoiding momentum buildup comprises a fifth process 909 of orienting the spacecraft to reduce the torque produced by the interaction between the spacecraft's dipole and the external magnetic field. More specifically, this can involve orienting the spacecraft such that the spacecraft's dipole vector $\vec{m}$ is substantially aligned with the magnetic field vector $\vec{B}$. In other words, in the present embodiment, this comprises setting the target dipole vector $\vec{M_t}$ to be equal to $\vec{B}$. When aligned in this fashion, the magnetic dipole and external magnetic field should produce little or no torque on the spacecraft, thereby imparting no further substantial momentum to the spacecraft, and allowing the total momentum of the spacecraft to remain at a minimal level. As can be appreciated, this allows for the spacecraft to be kept in a "parked" state indefinitely after the majority of its momentum has been unloaded. If sufficient momentum builds up again, the method can continue as normal with the subsequent processes to unload the excess momentum and return to a state where the momentum vector $\vec{H}$ is at or below the desired threshold. An exemplary simulation illustrating this process of parking the spacecraft is shown in FIG. 7. During period 700, the spacecraft is desaturated as normal by orienting the spacecraft in a desaturation orientation. In period 701, once the momentum has been reduced below a predetermined threshold, the spacecraft is oriented towards a parking orientation in which the momentum is maintained relatively constant, with only minor fluctuations.

Although in the present embodiment a single threshold was described, it is appreciated that two or more thresholds can be defined, for example to define a smoother transition between the targeted desaturating orientation and the parking orientation of the spacecraft and/or to allow for minor adjustments in the spacecrafts orientation to prevent momentum from building up. For example, in some embodiments, a first and second threshold can be defined. When the momentum is below the first threshold, the spacecraft can be oriented in a parking orientation to reduce or eliminate torque created by interaction of the dipole and external magnetic field. When the momentum is above the second threshold, the spacecraft can be oriented according to a desaturation orientation to produce a torque to oppose momentum in the spacecraft. When the momentum is between the first and second thresholds, the target orientation of the spacecraft can be set somewhere between the parking and the desaturation orientation, depending on how close the momentum is to the first or second threshold. In the present embodiment, this can correspond to setting $\vec{M_t}$ to $\vec{B}$ when $M_{factor}$ is below the first threshold, keeping $\vec{M_t}$ as is when $M_{factor}$ is above the second threshold, and when $M_{factor}$ is between the first and second thresholds, rotating $\vec{M_t}$ towards $\vec{B}$ (i.e. rotating $\vec{M_t}$ in a plane defined by $\vec{M_t} \wedge \vec{B}$) as $\vec{M_t}$ approaches the first threshold. It is appreciated, however, that other methods of transitioning between a parking orientation and a desaturation orientation are also possible.

Once the target orientation of the spacecraft has been determined, a subsequent process 911 can comprise positioning the spacecraft in the desired orientation. This can be accomplished, for example, by operating the reaction wheels (or other attitude adjustment actuators, such as thrusters, magnetorquers, etc.) to adjust the spacecraft's attitude as necessary. In this present embodiment, this comprises adjusting the attitude of the spacecraft such that dipole vector $\vec{m}$ is aligned with target dipole $\vec{M_t}$, in this case corresponding to an orientation which produces a torque opposing momentum vector $\vec{H}$. Once the spacecraft is correctly oriented, the produced torque will reduce the overall momentum of the spacecraft. Accordingly, the reaction wheels of the spacecraft can be desaturated in process 913, for example by slowing down the reaction wheels opposite the produced torque.

Figure 3:
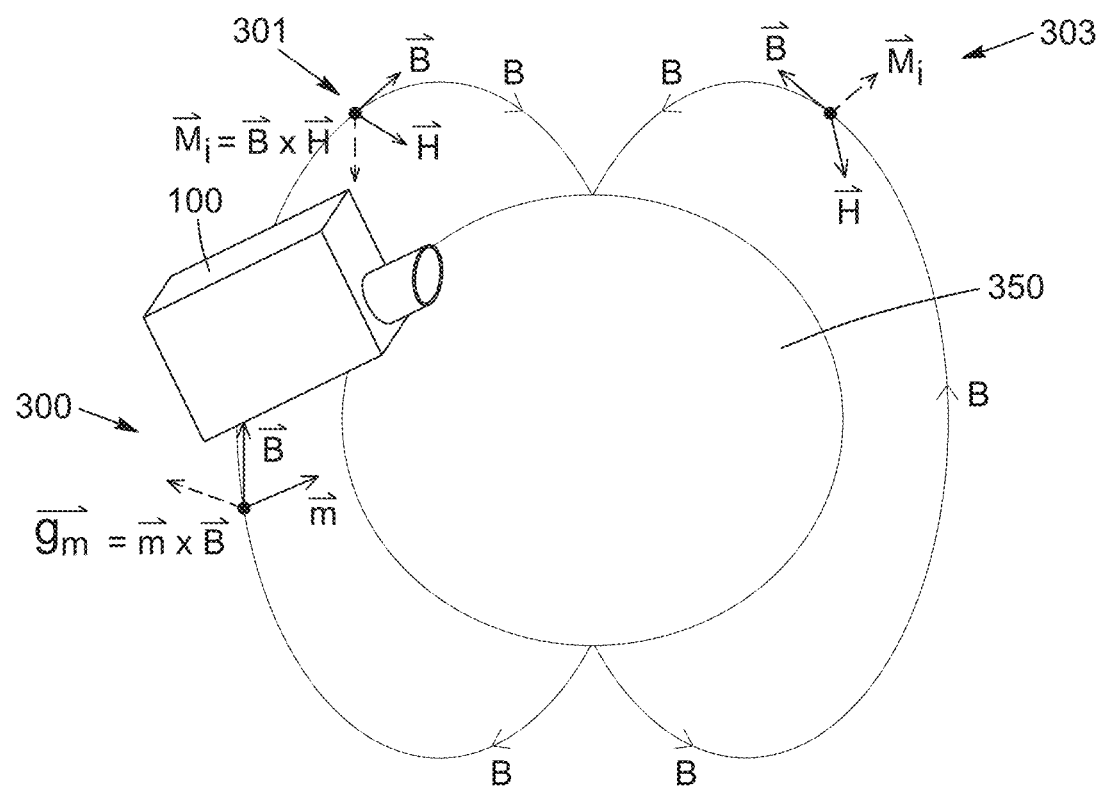
FIG. 3 is a schematic illustrating spacecraft and its interaction with Earth's magnetic field while in orbit.
Figure 4:
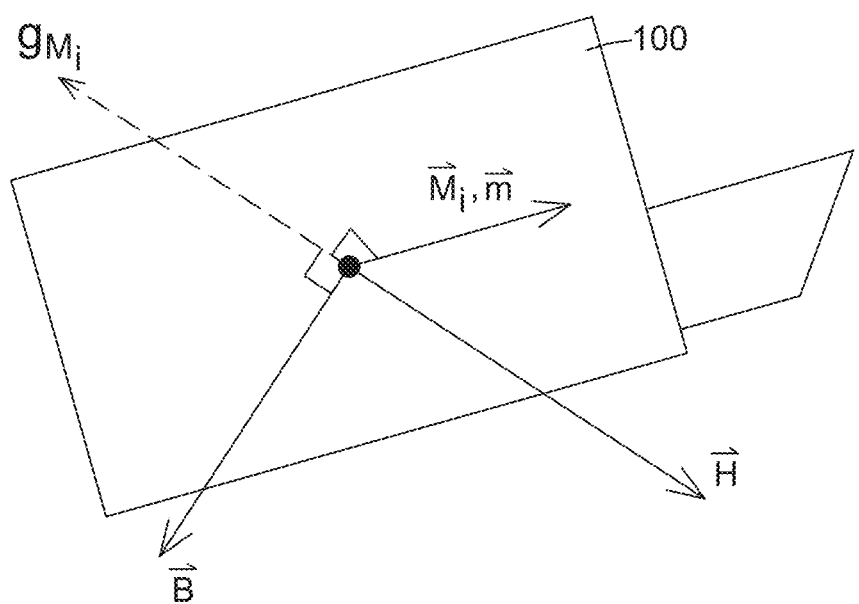
FIG. 4 is a schematic illustrating alignment of the spacecraft of FIG. 1 relative to an external magnetic field to produce a desired torque.

As illustrated schematically in orbital positions 301 and 303 of FIG. 3, throughout the spacecraft's trajectory, for example in orbit around the Earth 350, the external magnetic field vector $\vec{B}$ will change in the frame of reference of the body of spacecraft 100. Similarly, momentum vector $\vec{H}$ will change as momentum is unloaded. Accordingly, the processes of method 900 can be repeated continuously and/or at regular intervals, to recalculate the target orientation vector of spacecraft (in the present embodiment $\vec{M_t}$) as $\vec{B}$ and $\vec{H}$ change, and to reorient the spacecraft as necessary, in order to maintain a desired alignment of the spacecraft to produce a torque to reduce the momentum of the spacecraft and/or maintain the spacecraft in a parked state with low momentum.

Although particular processes of method 900 were described above in accordance with an exemplary embodiment, it is appreciated that in other embodiments, some processes can be omitted, and that in other embodiments, additional processes can be provided. For example, in some embodiments, in addition to controlling the spacecraft orientation to produce a desired torque, the method can include processes for purposely manipulating the spacecraft's dipole to assist in producing the desired torque. This can apply, for example, when one or two torque rods are operable. Accordingly, in such methods, at least some of the spacecraft's momentum can be absorbed by a torque produced via the spacecraft's residual dipole, while at least some of the remaining momentum can be absorbed via a controllable or variable dipole.

As can be appreciated, in the above-described method, it is assumed that the reaction wheels are able to fully absorb the spacecraft's momentum, such that they can be used to fully control the spacecraft's attitude and maintain a desired pointing direction. However, in some scenarios, the reaction wheels may be oversaturated or hyper-saturated, and control authority of the spacecraft would be lost, such that it would not be possible to maintain the spacecraft in a desired orientation. Accordingly, the spacecraft could be tumbling uncontrollably. Accordingly, in some embodiments, a method can be provided to slowly desaturate the reaction wheels while tumbling (i.e. while control authority is lost) until attitude control can be regained, prior to performing the method 900.

Figure 10:
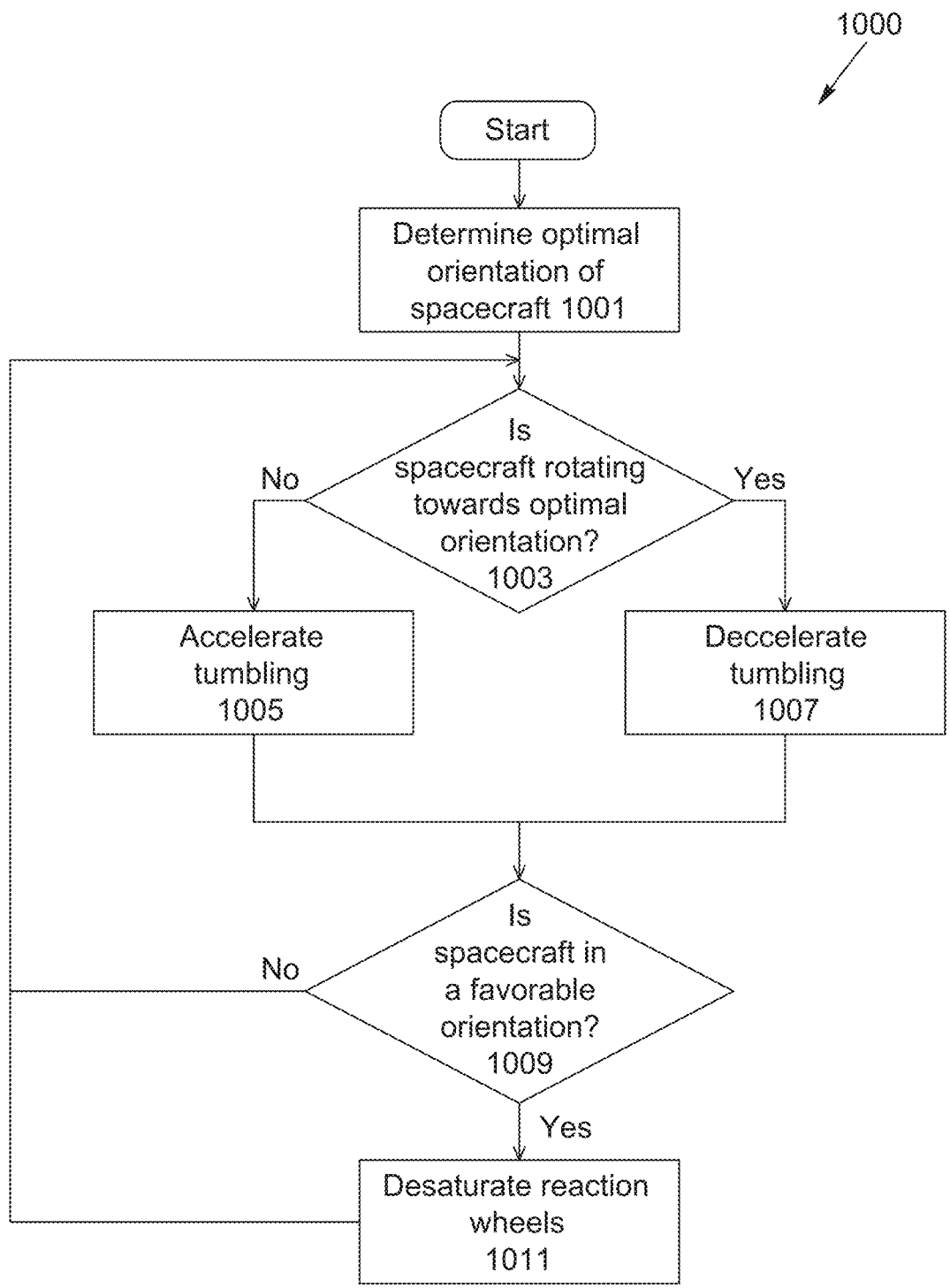
FIG. 10 is a flowchart illustrating a method for dumping momentum from a spacecraft in the absence of control authority in the reaction wheels, according to an embodiment.

An exemplary method 1000 for dumping momentum from a spacecraft in the absence of control authority in the reaction wheels is shown in FIG. 10. In a first process 1001, an optimal or desired orientation of the spacecraft can be determined. In some embodiments, the optimal or desired orientation can correspond to an orientation of the spacecraft which produces a torque which at least partially opposes the spacecraft's momentum. For example, the optimal orientation can correspond to the target dipole vector $\vec{M_t}$ as described above in method 900 and can be calculated in a similar fashion. It is appreciated, however, that the desired orientation can correspond to any orientation which produces a torque which can be useful in desaturating the reaction wheels of the spacecraft.

Figure 6:
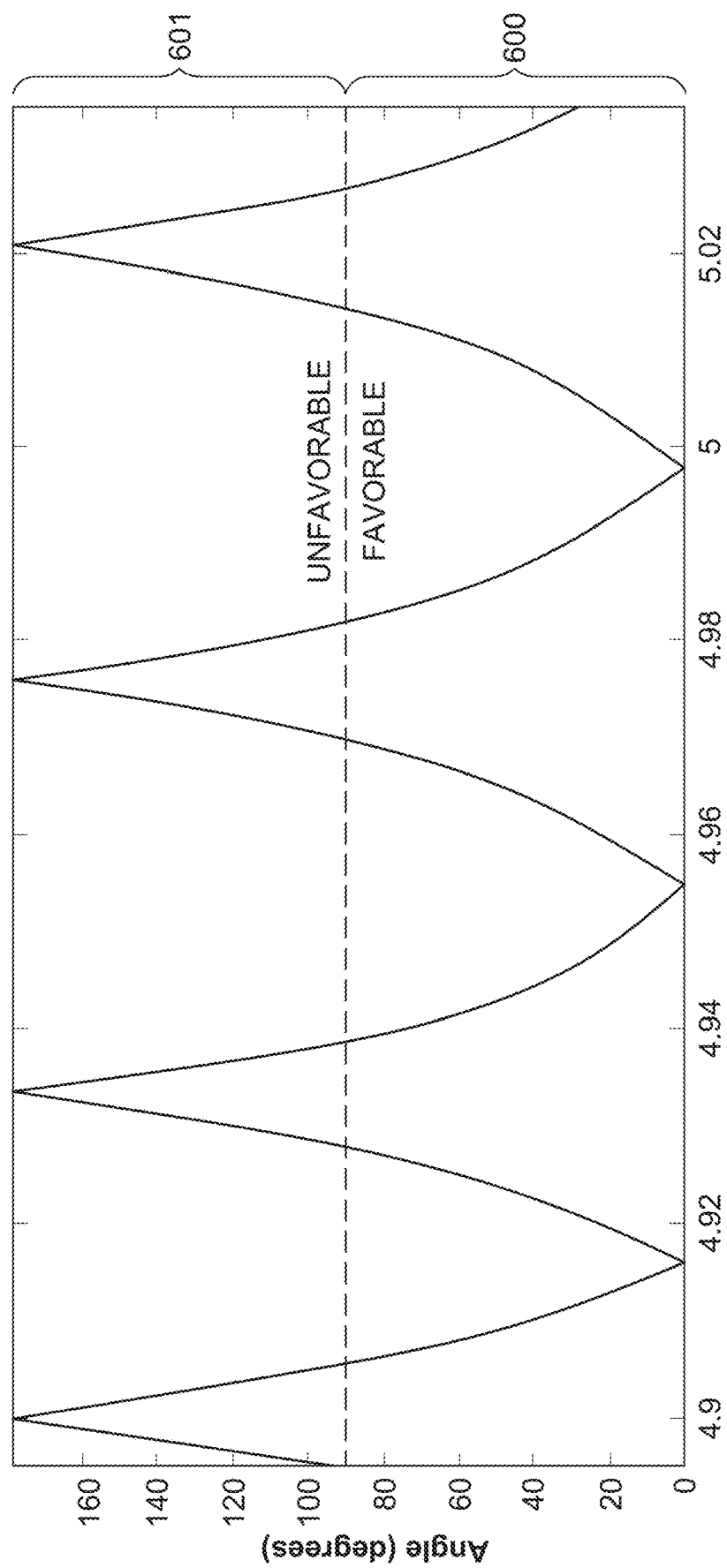
FIG. 6 is a simulation graph illustrating momentum unloading of the spacecraft while in a stumbling state.

Subsequent processes of method 1000 can involve using whatever control measures are available in order to control the rate and/or direction of the tumble (if possible) to maximize the amount of time the spacecraft spends in an orientation in which the produced torque reduces the spacecraft's momentum (i.e. in a favorable orientation) and minimize the amount of time the spacecraft spends in an orientation in which the produced torque increases the spacecraft's momentum (i.e. in an unfavorable orientation). For example, in the present embodiment, this can comprise a process 1003 of determining whether the spacecraft is rotating towards the optimal orientation. In the negative, the tumbling of the spacecraft can be accelerated in process 1005, for example by slowing down the reaction wheels to transfer momentum to the body of spacecraft. In the affirmative, the tumbling of the spacecraft can be decelerated in process 1007, for example by speeding up the reaction wheels to absorb momentum from the body of spacecraft. The resulting effect, as illustrated in the simulation of FIG. 6, is that the spacecraft will spend more time in a favorable orientation 600 (ex: angle between 0° and 90° relative to the optimal orientation) compared to an unfavorable orientation 601 (ex: angle between 90° and 180° relative to the optimal orientation), with a net result of the spacecraft's momentum being reduced over time. Although a particular method for controlling tumbling has been described, it is appreciated that other methods are possible, so long as the net effect is that the net torque applied is one that reduces the spacecraft's overall momentum. In processes 1009 and 1011, while the spacecraft is in the favorable orientation 600, the reaction wheels can be desaturated. The processes of method 1000 can be repeated until the reaction wheels have been sufficiently desaturated to regain attitude control authority and use attitude control functionality to remove the spacecraft from the tumbling state by transferring momentum from the body into the reaction wheels.

Figure 8:
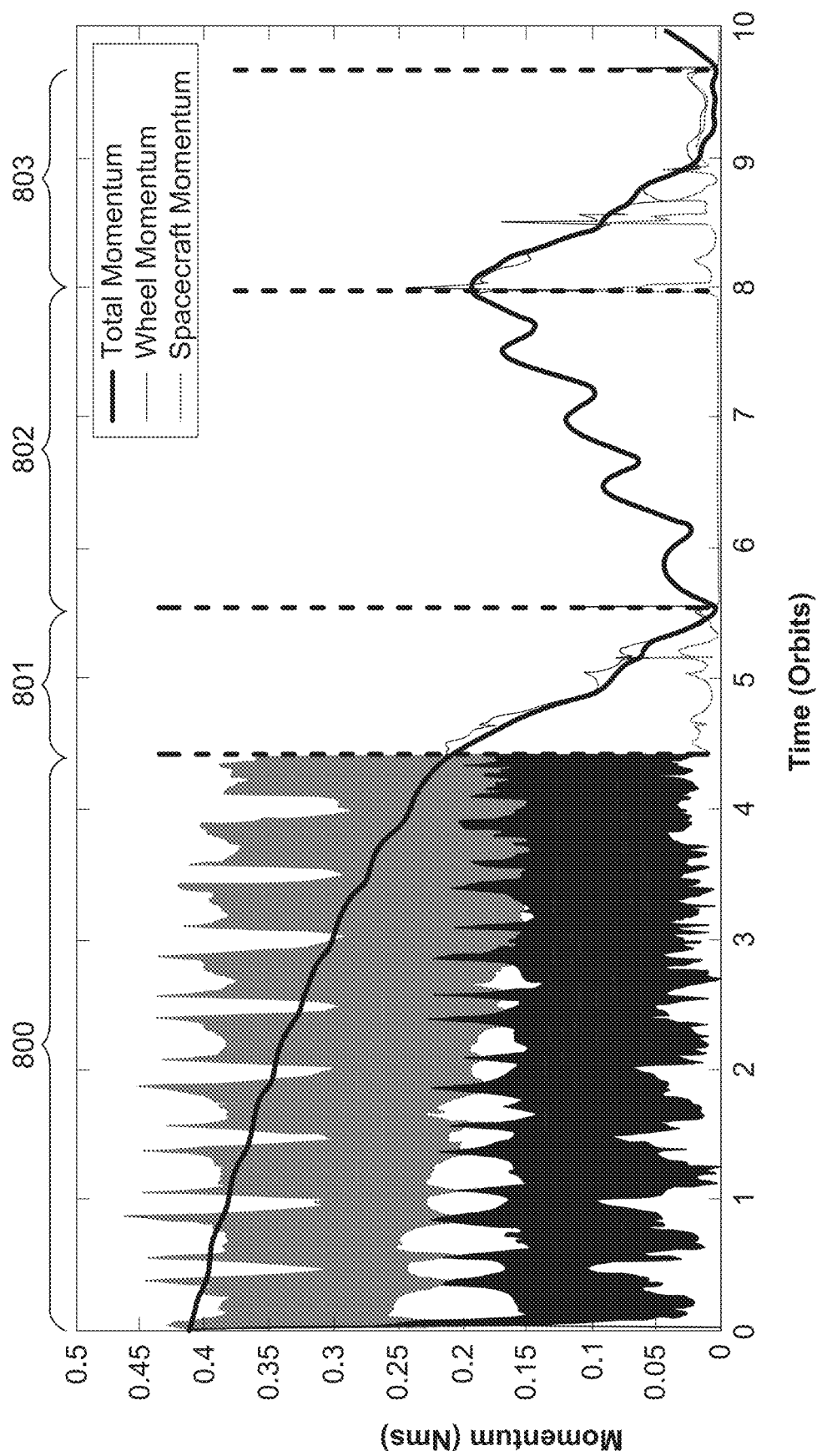
FIG. 8 is a simulation graph illustrating total spacecraft momentum during detumbling, desaturation, and resaturation.
Figure 11:
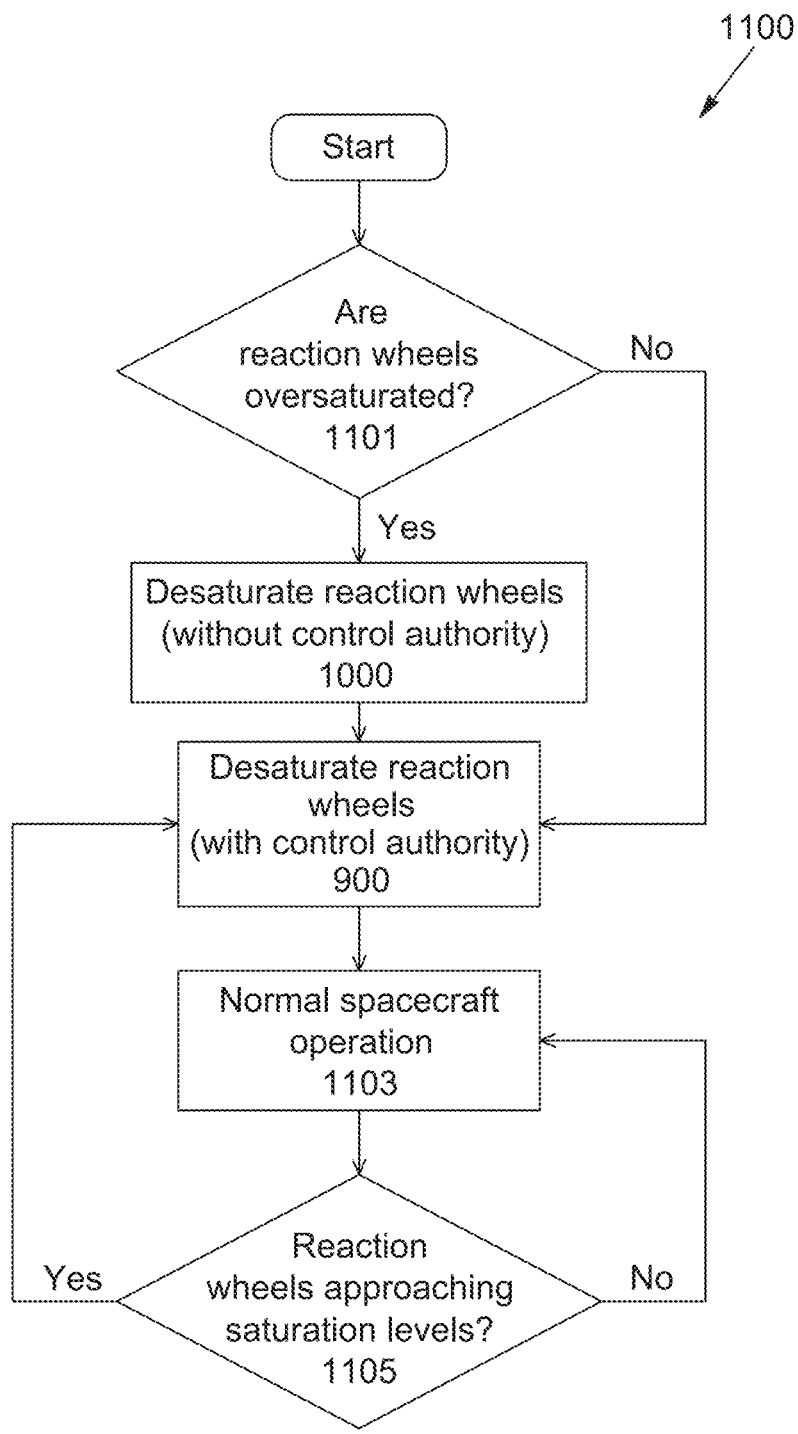
FIG. 11 is a flowchart illustrating transitioning between desaturation methods and resaturation, according to an embodiment.

As can be appreciated, the above-described methods can be used as needed during different control states of spacecraft operation to desaturate as necessary. By way of example, a method 1100 for operating a spacecraft is shown in FIG. 11. In the illustrated method, a first process 1101 can comprise determining whether the reaction wheels have the control authority to absorb the spacecraft's total momentum. In the negative, the spacecraft can be operated in a state in which desaturation is performed in a tumbling state, for example according to the method 1000 described above. As shown in period 800 of the simulation of FIG. 8, the spacecraft can remain in this state for an extended period of time until the total momentum of the spacecraft has been reduced to an acceptable amount. Once attitude control has been restored, the spacecraft can be operated in a more optimal desaturation state, in which attitude control is leveraged to more optimally reduce total spacecraft momentum to near zero, for example according to the method 900 described above. As shown in period 801 of the simulation of FIG. 8, the spacecraft can remain in the desaturation state until total spacecraft momentum is near zero. With total momentum at minimal levels, a subsequent process 1103 can comprise operating the spacecraft normally, orienting the spacecraft according to its nominal mission requirements. As can be appreciated, this can vary according to the function of spacecraft. For example, in the present embodiment, it can comprise operating the spacecraft in a fine pointing mode to point the spacecraft's telescope at a desired target in the context of a scientific mission. As can be appreciated, and as illustrated in period 802 of FIG. 8, the spacecraft momentum can fluctuate during this period, with an overall gain of momentum absorbed by the reaction wheels, resulting in resaturation thereof. Accordingly, in process 1105, it can be determined that the reaction wheels are approaching saturation levels, and the spacecraft can be transitioned back into a desaturation state 900. As illustrated in period 803 of FIG. 8, this will again desaturate the reaction wheels and reduce overall spacecraft momentum to minimal levels, eventually allowing the spacecraft to resume normal operation 1103.

As can be appreciated, the above described methods and corresponding systems can provide many advantages compared to methods and systems of the prior art. For example, the methods and systems can allow for spacecraft control without the use of torque rods and/or with only partial use of torque rods. This can allow for spacecraft recovery in case of total or partial torque rod failure, can allow for more efficient spacecraft design by allowing for the omission of torque rods, and/or can provide means to control a spacecraft while avoiding the use of energy-demanding torque rods. Of course, many other advantages will be apparent to one skilled in the art upon reading the present disclosure.

While the above description provides examples of embodiments, it will be appreciated that some features and/or functions of the described embodiments are susceptible to modification without departing from the spirit and principles of operation of the described embodiments. Accordingly, what has been described above has been intended to be illustrative and non-limiting and it will be understood by persons skilled in the art that other variants and modifications may be made without departing from the scope of the invention as defined in the claims appended hereto.

The invention claimed is:

1. A method for unloading momentum from a spacecraft having a magnetic dipole, the method comprising:
    determining a momentum vector corresponding to a magnitude and direction of momentum to be unloaded from the spacecraft;
    determining a target orientation of the spacecraft relative to an external magnetic field, wherein in said target orientation the magnetic dipole interacts with the external magnetic field to apply a torque in a direction at least partially opposing the momentum vector;
    operating at least one actuator to move the spacecraft into the target orientation; and
    maintaining the spacecraft in the target orientation to unload at least some of the momentum using the applied torque.

2. The method according to claim 1, further comprising:
    determining a magnetic dipole vector corresponding to a magnitude and direction of the magnetic dipole of the spacecraft; and
    determining a target diploe vector corresponding to a desired orientation of the magnetic dipole in which the magnetic dipole interacts with the external magnetic field to produce the torque in the direction at least partially opposing the momentum vector;
    wherein determining the target orientation of the spacecraft comprises determining an orientation of the spacecraft in which the magnetic dipole vector is aligned with the target dipole vector.

3. The method according to claim 2, wherein determining the magnetic dipole vector comprises:
    monitoring a change in momentum of the spacecraft over a trajectory of the spacecraft relative to a known or measurable external magnetic field, said change in momentum being caused by a torque applied to the spacecraft by the external magnetic field via the spacecraft's magnetic dipole; and
    using the monitored change in momentum and known or measurable external magnetic field to solve for the magnetic dipole vector.

4. The method according to claim 1, wherein the spacecraft comprises reaction wheels and unloading at least some of the momentum using the applied torque comprises slowing down the reaction wheels to unload momentum in a direction which opposes the applied torque.

5. The method according to claim 1, further comprising continuously determining an instantaneous orientation of the spacecraft; and continuously adjusting the orientation of the spacecraft to maintain an orientation of the magnetic dipole relative to the external magnetic field to either apply the torque in the direction at least partially opposing the momentum vector, or minimize torques and changes to momentum of the spacecraft.

6. The method according to claim 1, wherein momentum is unloaded without the use of torque rods.

7. The method according to claim 1, wherein the at least one actuator comprises reaction wheels, and operating the at least one actuator comprises operating the reaction wheels to adjust an attitude of the spacecraft.

8. The method according to claim 1, wherein the magnetic dipole is a permanent residual dipole of the spacecraft.

9. The method according to claim 1, wherein the external magnetic field is produced by a celestial body.

10. The method according to claim 1, wherein the spacecraft is in a tumbling state and the method further comprises:
    during a period of the tumbling in which the spacecraft is rotating towards the target orientation, operating the at least one actuator to decelerate the tumbling of the spacecraft; and
    during a period of the tumbling in which the spacecraft is rotating away from the target orientation, operating the at least one actuator to accelerate the tumbling of the spacecraft.

11. The method according to claim 1, further comprising:
    determining a magnetic field vector corresponding to a direction and magnitude of the external magnetic field relative to the spacecraft; and
    determining a target torque vector corresponding to the direction which at least partially opposes the momentum vector;
    wherein determining the target orientation of the spacecraft comprises determining an orientation of the spacecraft in which the magnetic dipole is oriented relative to the magnetic field vector to apply the torque in the direction of the target torque vector.

12. The method according to claim 11, further comprising determining a target dipole vector corresponding to a cross product between the magnetic field vector and the momentum vector, and wherein determining the target orientation of the spacecraft comprises determining an orientation of the spacecraft in which the magnetic dipole is aligned with the target dipole vector.

13. The method according to claim 11, further comprising applying an additional constraint to resolve a degree of freedom of the orientation of the spacecraft while the applied torque is in the direction of the target torque vector.

14. The method according to claim 11, wherein the target torque vector is calculated continuously throughout a trajectory of the spacecraft; and the spacecraft is continuously reoriented to maintain the orientation of the magnetic dipole relative to the external magnetic field to apply the torque in the direction of the target torque vector as the magnetic field vector and momentum vector change throughout the spacecraft's trajectory.

15. The method according to claim 11, further comprising, when the magnitude of the momentum vector is below a predetermined threshold, orienting the spacecraft to substantially align the magnetic dipole with the magnetic field vector.

16. The method according to claim 11, wherein the spacecraft is orbiting the Earth and the external magnetic field corresponds to Earth's magnetic field, further wherein the magnetic field vector is determined by determining a current position and orientation of the spacecraft relative to the Earth, and using a stored model of Earth's magnetic field to estimate the magnitude and direction of Earth's magnetic field at the determined current position and orientation.

17. A non-transitory computer-readable medium having instructions stored thereon which, when executed, cause a spacecraft to unload momentum according to the method of claim 1.

18. A spacecraft comprising:
a body;
at least one actuator for adjusting an attitude of the spacecraft; and
a controller in operative communication with the at least one actuator, said controller being programmed with instructions to:
determine a momentum vector corresponding to a magnitude and direction of momentum to be unloaded from the spacecraft;
determine a target orientation of the spacecraft relative to an external magnetic field, wherein in said target orientation of magnetic dipole of the spacecraft interacts with the external magnetic field to apply a torque in a direction at least partially opposing the momentum vector;
operate the at least one actuator to move the spacecraft into the target orientation; and
maintain the spacecraft in the target orientation to unload at least some of the momentum using the applied torque.

* * * * *